3,677,982
CELLULOSE SPONGE FOR REMOVING
OIL SLICKS
John W. Marx, Bartlesville, Okla., assignor to
Phillips Petroleum Company
No Drawing. Filed Aug. 5, 1970, Ser. No. 61,501
Int. Cl. C08b 29/38, 29/10; C08f 47/08
U.S. Cl. 260—2.5 R 5 Claims

ABSTRACT OF THE DISCLOSURE

Petroleum oil floating on the surface of water is removed therefrom by adsorbing the oil on a treated cellulose sponge and then burning the adsorbed oil from the sponge while it remains in contact with the water. During the combustion, the treated cellulose sponge continues to adsorb oil and deliver it to the combustion zone.

---

This invention relates to the removal of floating oil spills from the surface of water. It further relates to removing oil spills from water by burning the floating oil in place. This invention more particularly relates to a material and a process for using same whereby floating oil is adsorbed from the surface of water and the adsorbed oil is then continually burned from the material until the surface of the water is substantially free of floating oil.

In view of the important and growing requirement for the rapid and efficient removal of large quantities of oil from the surface of bodies of water, such as lakes, rivers and oceans, there has been considerable activity in the art directed toward this object. Suggested plans call for the distribution of various organic and inorganic materials on the oils to be removed. These materials adsorb the oil and then either sink, thus merely placing the contaminant under the water rather than removing it, or they must be physically removed from the water and burned or the oil removed therefrom such as by squeezing, pending reuse of the materials. Thus, these solutions are somewhat burdensome owing to the number of steps and thus the time involved in the removal, and owing to the inefficiency of the removal itself.

It is thus an object of this invention to provide a material which floats on and adsorbs oil from oil-covered water from which material the continuous and direct combustion of the oil is permitted without removal of the material from the water.

It is another object of this invention to provide a process for the removal of petroleum oil from the surface of water.

Other objects, aspects and the various advantages of my invention will be apparent to one skilled in the art from consideration of the following specification, example and claims.

In accordance with my invention, I have now discovered a novel material which is highly useful in the removal of water-borne oil which is spread over and floating on a wide expanse of water. More specifically, I have discovered that a "cellulose sponge" when rendered both hydrophobic (water-repellent) and oleophilic (oil-adsorbent) by treatment with a hereinafter-described agent will float on and adsorb oil from oil-covered water, will retain its water-buoyancy, and will not sink even when saturated with adsorbed oil. I have further discovered that the adsorbed oil can be ignited and burned from the treated cellulose sponge while it is in continuous contact with the water and that the sponge continues to adsorb and deliver oil to the combustion zone—in the nature of a wick—until the oil is substantially removed from and the water is substantially free of the oil contaminant. During the burning of the oil, the treated cellulose sponge does not melt or fuse; thus, by this wick action, combustion is not impeded and is sustained until the oil is substantially removed from the water.

The cellulose sponge useful in my invention can be a natural sponge or the conventional, commercially available, cellular, porous and permeable product which is fabricated from cellulose by well-known processes, one of which being the hereinafter briefly described viscose process. The commercially available product is preferred for use herein and is available from DuPont, General Mills, Nylonge Corporation and Burgess Cellulose Company.

The cellulose sponge, which is normally water-adsorbent, is rendered permanently water-repellent, i.e., hydrophobic, and oil-adsorbent, i.e., oleophilic, by treatment with a suitable agent. Such agents are compounds selected from the group consisting of styrene, methyl methacrylate and furfuryl methacrylate in combination with an organic peroxide soluble in the compound. In one presently preferred embodiment such useful peroxides are those selected from the group consisting of benzoyl peroxide and methyl ethyl ketone peroxide.

The quantity of compound required is in the range of 1 to 10 percent by weight of the weight of the cellulose sponge being treated, and the organic peroxide employed is present in the range of 0.5 to 10 percent by weight of the weight of compound. Thus, the weight ratio of cellulose sponge to compound to organic peroxide is in the range of 100:10:0.1 to 100:1:0.005.

The preferred treating agent is a combination of styrene and benzoyl peroxide.

The hydrophobic and oleophilic character of the material of this invention is developed by heating the cellulose sponge in the presence of the agent to a temperature in the range of 50° to 150° C., preferably 90 to 110° C., for a period of time in the range of from 0.5 to 1.5 hours. The time of the heating step is inversely proportional to the quantity of peroxide employed; thus, the more peroxide employed, the less time required for heating and, conversely, the less peroxide employed, the more time required for heating.

The sponge must be contacted with the agent prior to the heating step, and after a quantity of compound, within the above specified range, is adsorbed by the sponge, the compound-peroxide combination is heated, as previously noted, in the presence of the cellulose sponge. In the preferred method of contacting the sponge with the treating agent, the entire sponge is first saturated with the agent and then the sponge is squeezed or pressed to remove the agent therefrom. This squeezing is continued until the compound residual content of the sponge is within the previously specified range. The agent residual content of the sponge is conveniently determined by a difference between the dry and wet weight of the sponge.

The treated cellulose sponge is ready for oil adsorption-combustion use immediately following the heating period; however, there is no limitation on the time period subsequent to the heating step within which the material must be used. There is no limitation on the particular form of the material for the purpose of oil removal, however, the material is preferably thicker than the oil film and a portion of the material must extend above the surface of the oil.

The treated cellulose sponge is deployed in any convenient manner such as by air drop, or hand placement from a boat. For handling convenience, the material can be of small dimensions, such as 4-inch by 8-inch rectangles or 8-inch-diameter cylinders, but as previously noted there is no limitation on form.

The actual production of the cellulose sponge forms no part of my invention; however, for purposes of identification of the previously referred-to conventional, commercially available, cellular, porous, and permeable product fabricated from cellulose, the following general description of the so-called viscose process is provided.

Cellulose, acquired from a suitable source, such as cotton linters, wood pulp and the like, is treated with an alkali, such as sodium hydroxide, to produce alkali cellulose. The alkali cellulose is then treated with carbon bisulfide to produce sodium cellulose xanthate, which is a bright orange, crumb-like material. The xanthate is then dissolved in a weak sodium hydroxide solution to produce a viscous orange-tinted syrup which is known by those skilled in the art as viscose or the viscose solution.

To the viscose is added fine shredded vegetable fiber and salt crystals, such as crystals of sodium sulfate. The resulting mixture is thoroughly mixed and then poured into molding pans and heated. The heating causes the viscose to solidify around the solid salt crystals. Upon further heating, the salt crystals dissolve in the water that is part of their own composition. The resulting salt solution is drained away, leaving a solid, cellular, porous, and permeable product. Subsequent to washing and drying, the product which is now the "cellulose sponge" is ready for use in my invention.

The pore size of the "cellulose sponge" is controlled by the size of the salt crystals mixed in the viscose. Thus, large pores are the result of large crystals and small pores are the result of small crystals. In the commercial preparation of cellulose sponges, salt crystals of varying size are routinely added to the viscose to thus produce sponges of varying pore size. As far as pore size and permeability is concerned, there is no known limitation on the extent of permeability or pore size of cellulose sponges useful in my invention.

As previously stated, such cellulose sponges useful herein are of the type which are commercially available from various sources.

For further information concerning the commercial fabrication of cellulose sponges see, for example, Haynes, "Cellulose, the Chemical that Grows," (Doubleday, Garden City, N.Y. 1953) and Chemical Week, vol. 91, No. 17, p. 43.

EXAMPLE

A normally water-wet commercially available fabricated ellulose sponge having the approximate dimensions of 6 inches long by 4½ inches wide and 1½ inches thick and weighing approximately 50 grams was placed in contact with styrene having dissolved therein benzoyl peroxide to the extent of 0.5 percent by weight of the styrene. The sponge was immersed in the styrene-benzoyl peroxide solution and then removed and squeezed until only 5 grams of solution remained adsorbed on the sponge. This provided styrene to the extent of approximately 10 percent by weight of the sponge. The weight ratio of cellulose sponge to styrene to benzoyl peroxide was thus 100:9.95:0.05.

The solution-wet sponge was then heated in an oven to a temperature of 100° C. and the temperature was thus maintained for a period of 1 hour.

Subsequent to the heating step, the treated sponge was placed in a pond containing petroleum crude oil-contaminated water. The treated sponge floated on the surface of the water and adsorbed the oil therefrom but did not adsorb water. Leaving the sponge in the water, the adsorbed oil was ignited by a match and the adsorbed oil burned from the sponge until the water surface was essentially clean. It was observed that the oil slick itself (the nonadsorbed oil) could not be lighted by a match. During the burning, the sponge did not melt, burn or fuse and combustion was not impeded. However, after the oil was burned off, it was observed that the sponge was charred.

Reasonable variations and modifications of this invention can be made, or followed, in view of the foregoing disclosure, without departing from the spirit or scope thereof.

That which is claimed is:

1. A water-buoyant, hydropholic, oleophilic and cellular cellulose sponge omposition which is formed by the process which comprises completely wetting a normally water-adsorbent cellular cellulose sponge with a treating agent which consists of the combination of a compound selected from the group consisting of styrene, methyl methacrylate and furfuryl and an organic peroxide soluble in said ocmpound so as to saturate the entire cellulose sponge whereby said treating agent is uniformly adsorbed throughout the entire cellulose sponge, and thereafter heating the resulting treated cellulose sponge to thereby render said cellulose sponge both hydrophobic and oleophilic.

2. A composition according to claim 1 wherein said compound in said treating agent is present in the range of 1 to 10 percent by weight of said sponge.

3. A compound according to claim 2 wherein said organic peroxide is present to the extent of 0.5 to 1.0 percent by weight of the total weight of said compound.

4. A omposition according to claim 1 wherein said compound is styrene and said organic peroxide is benzoyl peroxide.

5. A composition according to claim 1 wherein said heating is carried out for a period of time in the range of 0.5 to 1.5 hours at a temperature in the range of 50° to 150° C.

References Cited
UNITED STATES PATENTS

| | | | |
|---|---|---|---|
| 2,434,106 | 1/1948 | Flood et al. | 260—17.4 GC |
| 2,996,409 | 8/1961 | Lavely | 260—2.5 A |

MURRAY TILLMAN, Primary Examiner

W. J. BRIGGS, SR., Assistant Examiner

U.S. Cl. X.R.

117—98; 210—DIG 21; 260—2.5 HB, 17 A, 17.4 GC